June 21, 1932.     O. A. FREDERICKSON     1,864,346
ELECTRICAL CABLE
Filed May 15, 1926
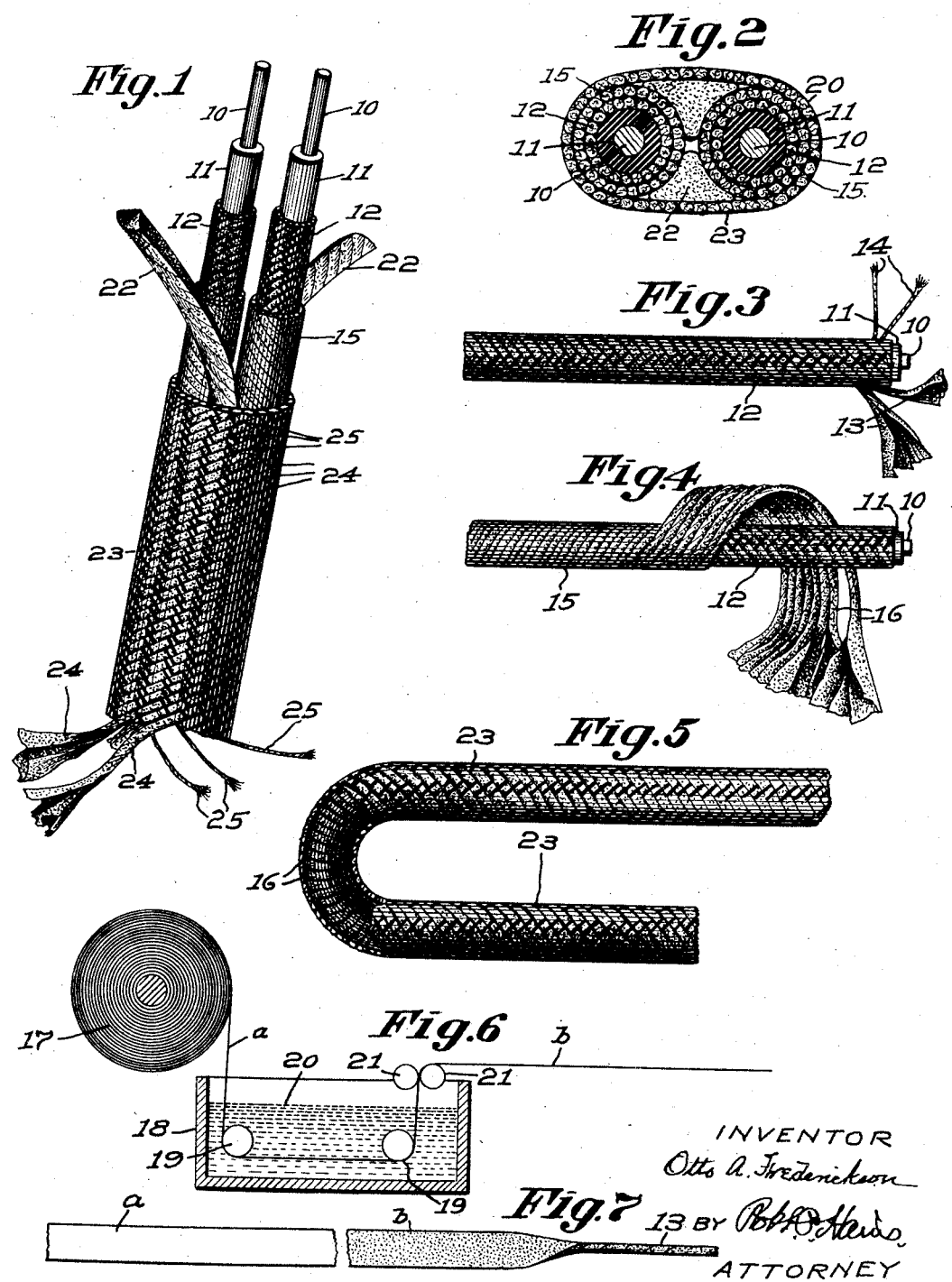

Patented June 21, 1932

1,864,346

UNITED STATES PATENT OFFICE

OTTO A. FREDERICKSON, OF WETHERSFIELD, CONNECTICUT, ASSIGNOR TO THE WIRE-MOLD COMPANY, OF HARTFORD, CONNECTICUT, A CORPORATION OF CONNECTICUT

ELECTRICAL CABLE

Application filed May 15, 1926. Serial No. 109,283.

This invention relates to electrical cables of the type employed in wiring buildings for electric light, heat and power circuits, and more particularly to cables having a non-metallic outer covering.

It is highly important that electrical conductors employed in wiring buildings for electric light and power currents be well insulated electrically and that they also be well protected mechanically.

In wiring buildings it is now customary to enclose the conductor wires in metal pipes, or to enclose them in flexible metallic sheaths. The metal pipes provide excellent mechanical protection for the conductor wires, but do not increase their electrical insulation, and these metal pipes constitute an expensive form of installation. The flexible metallic sheaths give good mechanical protection, but do not increase the electrical insulation, and are open to the objection that if the flexible sheath is crushed, an edge of the coiled metal strip forming the sheath is likely to cut and short-circuit the enclosed conductors.

It is extremely important that the metal pipe conduits and the flexible metallic conduits be well grounded. Often the grounding of the metal conduits is not effectively accomplished, in which event an extremely dangerous condition exists if a short-circuit occurs.

Having the foregoing in mind, the present invention relates to electrical cables having a non-metallic outer covering. Such non-metallic sheathed cables, in order to prove satisfactory must afford high electric insulating properties when the cables are wet, as well as when they are dry, and if the cables are to withstand the various injurious forces to which they may be subjected during installation and use the protecting jackets should be capable of withstanding a heavy crushing force, and also the cutting and chafing action of rough relatively sharp surfaces. Furthermore cables of the type to which the present invention is directed should be capable of being bent at a sharp angle without being injured.

One important feature of the present invention therefore resides in an electrical cable the metallic conductors of which are provided with protecting sheaths that are constructed of extremely tough durable material which will not be injured or appreciably affected by the exposure to moisture.

Another feature of the invention resides in the construction whereby the moisture proofing material with which the different parts of the cable are treated, serves also as a lubricant to facilitate relative movement between the jackets of the cables when the latter is bent, thereby increasing its flexibility.

In carrying out the present invention the different protecting coverings for the conductors are formed in whole or in part of twisted strips of paper. The strands formed of the twisted paper are extremely tough and durable, and in order to render these strands thoroughly moisture-proof, the paper of which they are formed is treated with a moisture proofing substance before the strips are twisted. This moisture proofing substance not only renders the twisted paper strands entirely waterproof but severes also as a lubricant which facilitates relative movement between the parts of the cable when the latter is bent at a sharp angle.

It is appreciated that protecting coverings for conductors have been treated heretofore with moisture-proofing compounds, but when these moisture-proofing compounds are applied to the covering upon the conductors as heretofore they cause the adjacent strands to adhere together, thus decreasing the flexibility of the covered conductor. In accordance with the present invention the moisture-proofing substance is applied to the paper strands before they are laid about the conductor with the result that the compound does not act to adhesively attach the adjacent strands as heretofore, but imparts to each strand a smooth slick surface that facilitates its movement in the covered conductor and thus increases the flexibility of the finished product.

Other features of the invention in addition to the above will be herinafter described in connection with the accompanying drawing showing a cable constructed in accordance with the present invention.

In the drawing:—

Fig. 1 is a perspective view of a short section of cable constructed in accordance with the present invention;

Fig. 2 is a transverse sectional view through the cable of Fig. 1;

Fig. 3 is a side view of one of the metallic conductors provided with a rubber covering and braided protecting sheath;

Fig. 4 is a side view showing a series of strands wound spirally about the braided sheath of Fig. 3 to form a second protecting sheath;

Fig. 5 is a side view of a bent portion of the cable of Fig. 1;

Fig. 6 is a diagrammatic view of means for treating the strips of paper before they are twisted; and Fig. 7 is a side view of a strip of paper shown partly twisted.

The electrical cable shown in the drawing is provided with two metallic conductors 10, but the features of the present invention may be embodied in cables provided with a single conductor or with more than two conductors. Each of the conductors 10 is provided with a covering 11 formed of rubber or other suitable material.

In the construction shown a braided protecting sheath 12, of special construction is placed about each covering 11. This braided covering is formed of relatively large, hard strands 13 that extend about the conductor in one direction, and of small strong strands 14 that extend about the conductor in the opposite direction. The strands 13 are formed of hard twisted paper and the strands 14 are formed of twisted fibres such as cotton. The large hard strands 13 are bound closely together by the small strong strands 14, which sink into the surface of the twisted paper strands and hold them practically in contact with each other about the conductor. In this manner an extremely strong durable covering is provided about the sheath 11.

Each of the conductors 10 is provided with a second protecting sheath 15 formed of a series of hard twisted paper strands 16 that are laid side by side to form what may be called a "ribbon," as shown in Fig. 4, and which is wound spirally about the braided sheath 12.

It is important that the relatively large strands of paper used in the braid 12, and which form the sheath 15, be rendered completely water-proof so that they will not absorb moisture which will cause the paper to rot or deteriorate. An important feature of the present invention therefore resides in a cable the protecting sheaths of which are formed in whole or in part of twisted paper strips that are thoroughly impregnated with a moisture proofing substance before the paper strips are twisted. In this manner the paper strands 13 and 16 are rendered completely water-proof so that they will not deteriorate when exposed to moisture.

The untwisted strips of paper are preferably treated with a wax-like moisture proofing substance such, for example, as paraffine, since it is desirable that the substance employed serve not only to render the paper moisture proof, but that it serve also as a lubricant that will facilitate relative movement between the different parts of the cable when the cable is bent at a sharp angle. This will be apparent from the bent portion of the cable shown in Fig. 5 where it will be seen that the strands 16 have spread out slightly at the outer curve of the bend to prevent a substantial gap from occurring between any two strands.

One means for treating the untwisted strips of paper with water-proofing substance is shown in Fig. 6 where the paper strips $a$ to be treated are drawn from a source of supply 17 downwardly into the tank 18 to pass under the guide bars or rollers 19 positioned below the level of the waterproofing liquid 20. The tank 18 may be heated by any suitable means (not shown) to keep the moisture proofing substance in the tank in the liquid state. The treated strips of paper $b$ are led upward between the rolls 21 which squeeze out the excess liquid and the strips $b$ are then twisted by any suitable means (not shown). The treatment of the paper $a$ in the manner just described insures the same being rendered completely moisture-proof, also makes it easy to twist, wind and braid. It will be apparent, however, that it is not essential that the paper be treated while in the strip form, since the paper may be treated with the water-proofing substance while in the form of wide sheets, or, if desired, the pulp may be treated with the water-proof substance before it is made into paper.

Within the valleys formed between the covered conductors 10 are laid the fillers 22 which are preferably formed of large cords that are sufficiently soft to cause the fillers to conform to the shape of the valleys. The fillers 22 are preferably treated with the wax-like moisture-proofing substance above mentioned to render them water-proof and also to lubricate the fillers so that relative movement may take place between the fillers, protecting sheath and outer jacket to relieve the fillers from excessive strain when the cable is bent at a sharp angle.

The outer jacket 23 for the covered conductors is preferably formed of a braid similar to the braid 12 above described. That is, the outer jacket 23 is formed of twisted strands of paper 24 that extend in one direction, and which are bound in place by small strong strands 25 that extend in the opposite direction, and the paper strands 24, like the strands 13 and 16, are treated with a water-proofing substance before the paper strips are twisted.

The outer jacket 23 is preferably further treated with a fire-and-water repellant material such as stearin pitch, and powdered mica may be applied to the treated jacket to prevent the adjacent coils of the cable from sticking.

It will be seen from the foregoing that by treating the protecting sheaths 12 and 15, filler cords 22 and outer jacket 23 with a wax-like substance that renders them water-proof, and also serves as a lubricant, the twisted paper strands will not be injured by the exposure to moisture, and that when the cable is bent at a sharp angle sufficient relative movement will take place between the part of the cable to relieve the fillers and protecting coverings from injurious stresses. It will also be apparent that the hard twisted strands of paper form extremely tough, durable coverings for the conductors.

Where the hard twisted paper strands are treated with a water-proofing compound after they have been formed, the water-proofing compound or substance fails to penetrate the hard twisted strands and remains upon such strands mainly as a surface covering. Where, however, the paper of which the strands of the braided cover are formed is treated previous to the formation of the strands themselves, in accordance with the present invention, the water-proofing compound such as paraffine or the like penetrates throughout the substance of the paper and the entire substance of the paper strand subsequently formed is completely saturated, with the result that it offers a most excellent water repellant condition not attainable by a mere surface treatment of the hard twisted paper strands, in which latter case any flexing of the non-metallic sheath cable tends to disturb the water-proof surface covering, a condition which is met and overcome by treatment of the paper with the water repellant material prior to its being twisted into paper strands, and thus meeting all requirements of the fire underwriters.

What is claimed is:

An article of manufacture, comprising in combination, a metallic conductor having a surrounding covering of insulating material, and a protecting sheath constructed largely of strong tough strands of paper formed of ribbon like strips of paper impregnated with liquid paraffin and twisted after the paraffin has set to form rounded paper strands that are moisture proof and thoroughly lubricated throughout and the lubricated condition of which facilitates movement between the strands when the covered conductor is bent.

In testimony whereof, I have signed my name to this specification.

OTTO A. FREDERICKSON.